(12) United States Patent
Cannata

(10) Patent No.: US 9,068,644 B2
(45) Date of Patent: Jun. 30, 2015

(54) GEAR HUB HAVING A GEAR PUMP

(71) Applicant: Tonand Brakes Inc., London (CA)

(72) Inventor: Antonio Cannata, London (CA)

(73) Assignee: Tonand Brakes Inc., London (CA)

( * ) Notice: Subject to any disclaimer, the term of this patent is extended or adjusted under 35 U.S.C. 154(b) by 132 days.

(21) Appl. No.: 13/721,939

(22) Filed: Dec. 20, 2012

(65) Prior Publication Data
US 2014/0174230 A1    Jun. 26, 2014

(51) Int. Cl.
*B60K 17/04* (2006.01)
*F16H 57/04* (2010.01)

(52) U.S. Cl.
CPC ....... *F16H 57/0441* (2013.01); *Y10T 74/19642* (2015.01); *B60K 17/043* (2013.01)

(58) Field of Classification Search
USPC ............... 180/371, 374; 280/201, 92, 93.512; 74/412 R
See application file for complete search history.

(56) References Cited

U.S. PATENT DOCUMENTS

| | | | |
|---|---|---|---|
| 2,305,836 A * | 12/1942 | Ash ............................. | 301/36.2 |
| 7,493,992 B2 * | 2/2009 | Rogers ......................... | 188/71.5 |
| 8,297,385 B2 * | 10/2012 | Chien et al. ................. | 180/24.03 |
| 8,499,664 B2 * | 8/2013 | White et al. ................. | 74/607 |
| 8,662,277 B2 * | 3/2014 | Schoon ........................ | 192/221.1 |
| 2004/0118627 A1 * | 6/2004 | Ohtsuki et al. ............... | 180/312 |
| 2013/0161148 A1 * | 6/2013 | Schoon ........................ | 192/219.4 |

* cited by examiner

*Primary Examiner* — Toan To
(74) *Attorney, Agent, or Firm* — Grant Tisdall; Gowling Lafleur Henderson LLP

(57) ABSTRACT

A gear hub assembly is disclosed that has a sealed housing that includes an input gear and an output gear that are meshed together to provide a gear pump to move fluid between a fluid inlet and a fluid outlet disposed on opposite sides of engagement of the input and output gear. The housing defines an axle shaft-receiving aperture and a wheel spindle-receiving aperture to allow the gear hub assembly to transmit torque from a vehicle axle shaft to a wheel spindle while operating as a gear pump. The fluid inlet and outlets can be coupled to a hydraulic system to provide braking (or kinetic energy recovery) by restricting the flow of hydraulic fluid which in turn resists rotation of the gears in the gear hub, and thus can act to slow the vehicle.

18 Claims, 9 Drawing Sheets

GEAR HUB HAVING A GEAR PUMP

FIELD

The present disclosure relates generally to a geared hub for driving wheels of a vehicle. More particularly, the disclosure relates to an energy capture and return of a braking system for use in conjunction with a geared hub.

BACKGROUND

It is common practice with four wheel drive type vehicles to use a central gear box or differentials, the output of which is fed directly to the individual driven wheels of a vehicle. In applications where high ground clearance is required it is desirable to have the axle shaft of each wheel couple to a position higher than the wheel spindle using a geared hub. The axle shaft connects to a pinion gear of the geared hub that is meshed with an output gear normally splined to the wheel spindle. The use of the two gears at the wheel allows for increased ground clearance and a reduction in the gearing in the central gear box because some of this gearing is now taking place in the geared hub.

The geared hub design is commonly used by AM General LLC in its HMMWV military product and in the civilian Hummer vehicles. An example of a prior art geared hub is provided as FIG. 1. A geared hub is typically used with a portal axle where the axle tube is above the center of the wheel hub. Using the portal axle provides increased ground clearance, as both the axle tube and differential casing are tucked up higher under the vehicle. Geared hubs can also be used with inverted portal axles where the axle tube is below the center of the wheel hub that can be used, for example, in a low floor bus that provides easier passenger access.

Typical braking mechanisms for vehicles use a friction-based brake that applies a fixed surface against a rotating drum or disk that is coupled to the wheel of the vehicle. The friction material applied against a drum or disc resists the rotation of the wheel and stops the vehicle due to the friction force between the tire and the road surface. The kinetic energy of the vehicle is converted to heat energy by the friction surfaces.

Friction-based brakes are subject to wear of the friction surfaces and can generate large amounts of heat that both lead to maintenance and performance issues. The friction surfaces, such as drums and discs, wear down and require frequent replacement, and can be a large expense when managing a large fleet of vehicles. The rate of wear can be increased due to temperature, vehicle load, foreign debris between the friction surfaces. For example, in a loose soil environment the heat and soil/sand can increase wear on the friction surfaces and other braking components requiring premature replacement. A buildup of heat on the friction surfaces from heavy or sustained braking can result in a loss of stopping power due to brake fade. Friction brakes are also subject to brake fade from overheating fluid, or debris between the braking surfaces.

SUMMARY

According to a first aspect, a gear hub assembly is provided that comprises a housing defining a first shaft-receiving aperture and a second shaft-receiving aperture; an input gear within the housing aligned with the first shaft-receiving aperture; an output gear within the housing engaged with the input gear, the output gear aligned with the second shaft-receiving aperture; and wherein the housing provides a fluid inlet and a fluid outlet disposed on opposite sides of engagement of the input gear and output gear. In some aspects, the input gear receives a rotational force and the rotational force is transferred from the input gear to the output gear. In some cases the rotational force can be provided by a vehicle axle shaft attached to the input gear, such as by splining the input gear with the axle shaft. In some aspects, the axle shaft can be supported by a pair of tapered bearings seated in end cap recesses on each side of the input gear.

In some aspects, the output gear can also be configured to be coupled to a wheel spindle. The housing can include a pair of tapered bearings on each side of the output gear that are configured to support a wheel spindle. The housing end caps can further define recesses for seating the tapered bearings on each side of the output gear.

In other aspects, the gear hub assembly can further comprise a pair of thrust plates, each one of the plates adjacent opposing faces of the input gear and output gear. In yet another aspect, the gear hub assembly can have the axle shaft-receiving aperture and the wheel spindle-receiving aperture both located on one side of the housing, such as in a single end cap, for example.

In still a further aspect, the gear hub assembly can have a disposable sleeve lining the interior of the housing that can be removed and replaced with wear. The disposable sleeve provides a tight tolerance between the input gear and output gear and the disposable sleeve. In some aspects, the disposable sleeve can be comprised of one or more partial sleeves. In a related aspect, the disposable sleeve can have an increased thickness in areas of high wear from any one of the input gear and output gear.

In yet another aspect, the gear hub assembly can have the fluid inlet and outlet coupled to a hydraulic system. The hydraulic system can provide braking to resist rotation of the input and output gear by restricting the flow of fluid. In other aspects, the hydraulic system can comprise a kinetic energy recovery system.

According to another aspect, a vehicle is provided that has at least two gear hub assemblies. An axle shaft of the vehicle can be coupled to the input gear and a wheel spindle coupled to the output gear of each of the gear hub assemblies. The vehicle can include a portal axle or inverted portal axle to couple the at least two gear hub assemblies.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the possible implementations of various embodiments that can be varied as known by a person skilled in the art.

Although some embodiments may explicitly refer to the vehicles, it will be understood by those of ordinary skill in the art that teachings described herein may be applied to both powered and unpowered vehicles (e.g. trailers, rail). Also, although some embodiments explicitly refer to braking a wheel, it will be understood by those of ordinary skill in the art that the teachings described herein can be applied more generally to restricting any rotary motion in a vehicle to either provide braking or to provide kinetic energy recovery.

The term "gear pump" is used herein to refer to pumping fluid by displacement from meshing gear teeth. Gear pumps can use two gears that come into and out of mesh to produce flow. Two gears rotating against each other—one of the gears is driven and it in turn drives the other gear. Each gear is supported by a shaft with bearings on both sides of the gear. As the gears come out of mesh, they create a low pressure region on the inlet side of the pump. Liquid flows into the cavity and is trapped between the gear teeth and the removable sleeve as the gears rotate. On the outlet side, the meshing of the gears forces liquid through the outlet port under pressure.

Although the term "pump" is used, it is also recognized that a gear pump can also act as a motor to provide rotary motion from fluid flow. The term "gear pump" is used herein to refer to the gear hub assembly acting as a motor or as a pump as should be clear from the context the term is used to a person skilled in the art.

Figure 1:
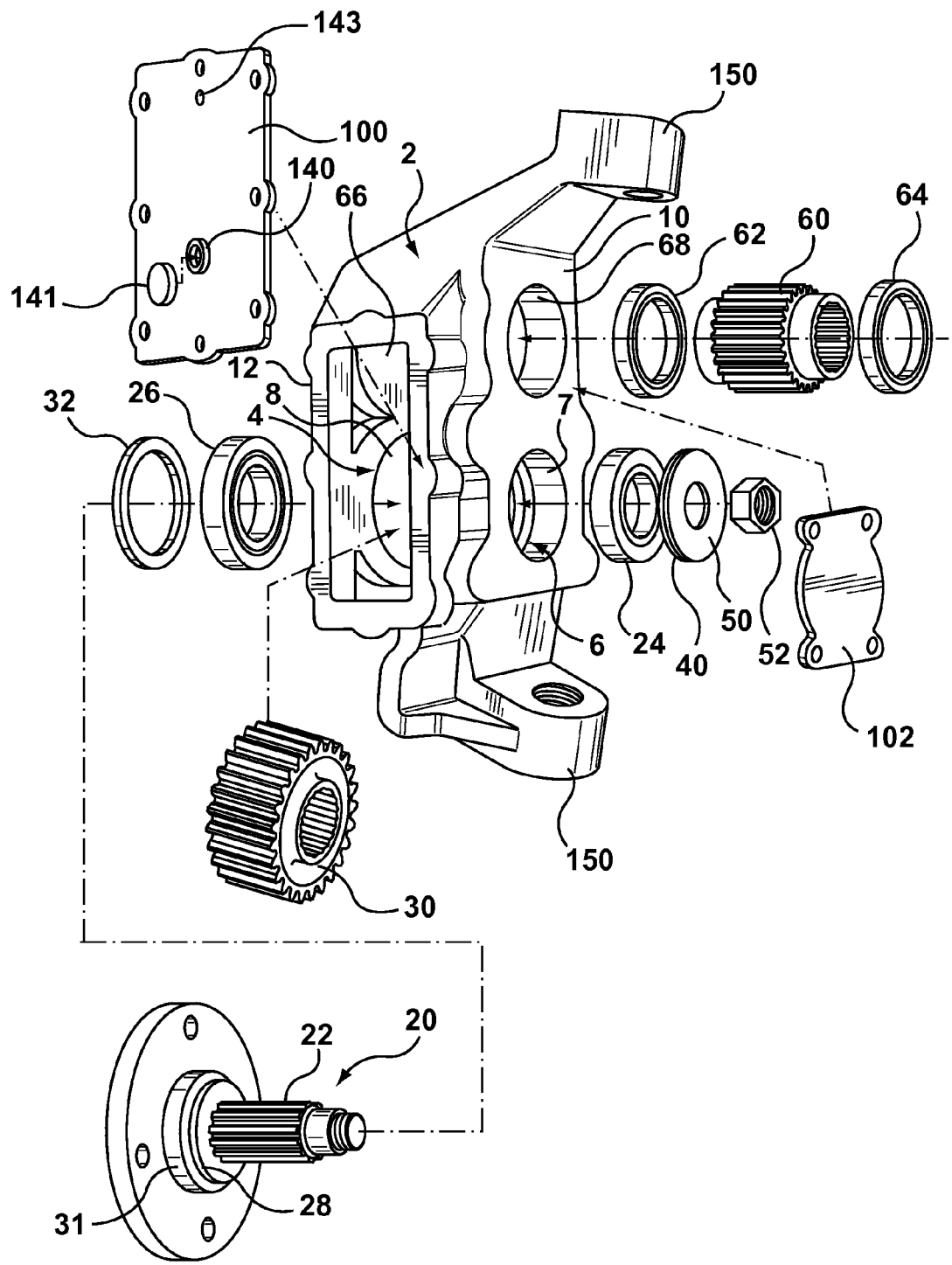
FIG. 1 is an exploded perspective view of a prior art gear hub assembly.
Figure 2:
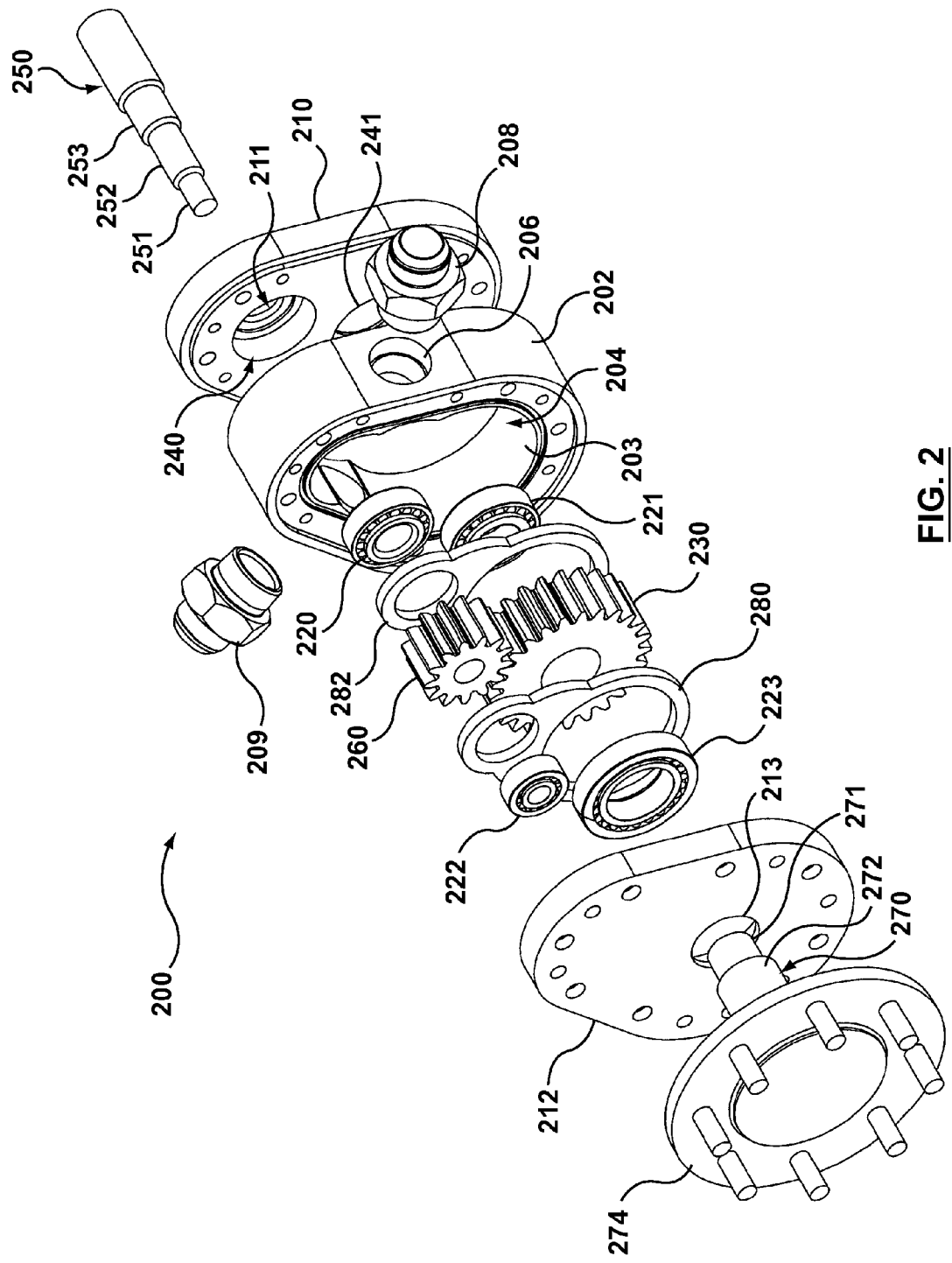
FIG. 2 is an exploded perspective view of a gear hub assembly including a gear pump.

Reference is first made to FIG. 1 illustrating an exploded perspective view of a prior art gear hub assembly. The illustrated prior art embodiment has a one piece cast housing 2 that includes the elongated standard spur gear chamber 4. Other embodiments can include a housing arrangements such as a split housing. First access means 6 includes two apertures 7 and 8 provided in the end walls 10 and 12 of the casing that can be formed during the casting operation of housing 2. The first access means allows the wheel spindle 20 to pass through the housing 2 and through output gear 30 that is placed within gear chamber 4 and aligned with the shaft 22 of wheel spindle 20. Bearings 24 and 26 are provided at either end of the wheel spindle and engage apertures 7 and 8 respectively. Bearing 26 is sized to easily slide over the splined shaft portion 22 and engage surface 28 provided on the wheel spindle. Stepped portion 31 of the wheel spindle engages sealing ring 32 to seal aperture 8 of the gear chamber. Snap ring 40 is provided to cooperate with shaft 22 and accurately position output gear 30 on the shaft. Bearing 24 cooperates with aperture 7 which has a stepped cross section whereby, washer 50 and nut 52 may be used to adjust the end play of the wheel spindle with respect to the bearings.

The input pinion 60 is secured within housing 2 by bearings 62 and 64. Bearing 62 engages recess 66 provided in one end wall of the housing and bearing 64 engages aperture 68 provided in the opposite end wall of the housing. As shown, input pinion 60 is inserted directly through aperture 68 which forms a second access means in one end wall of the casing. A permanent cover plate 100 is sized to close rectangular opening provided in a sidewall of the casing. Cover plate 102 is sized to close aperture 68 however, this cover plate would be removed when the splined input shaft is placed within the input pinion 60. At the top and bottom of housing 2 are geared hub mounting brackets 150 that form part of the pin mounting arrangement used to pivotally secure the gear hub assembly to a vehicle. These mounting brackets transmit the force exerted by the wheel on the casing to the frame of the vehicle.

In assembling the gear hub assembly, bearings 62, 26, and 24 are positioned within the gear chamber and input pinion 60 and bearing 64 are then secured in place. The output gear may then be inserted within gear chamber 4 through rectangular opening 4 and positioned to align with the wheel spindle 20. The output gear 30 is splined and carried on the wheel spindle which is supported within the case by bearings 26 and 24. All apertures 7, 8 and 68 are subsequently sealed and the wheel spindle adjusted by nut 52 such that the end play on the wheel spindle is within acceptable tolerances. Cover plate 100 is then installed and aperture 140 is subsequently sealed by plug 141.

Figure 3:
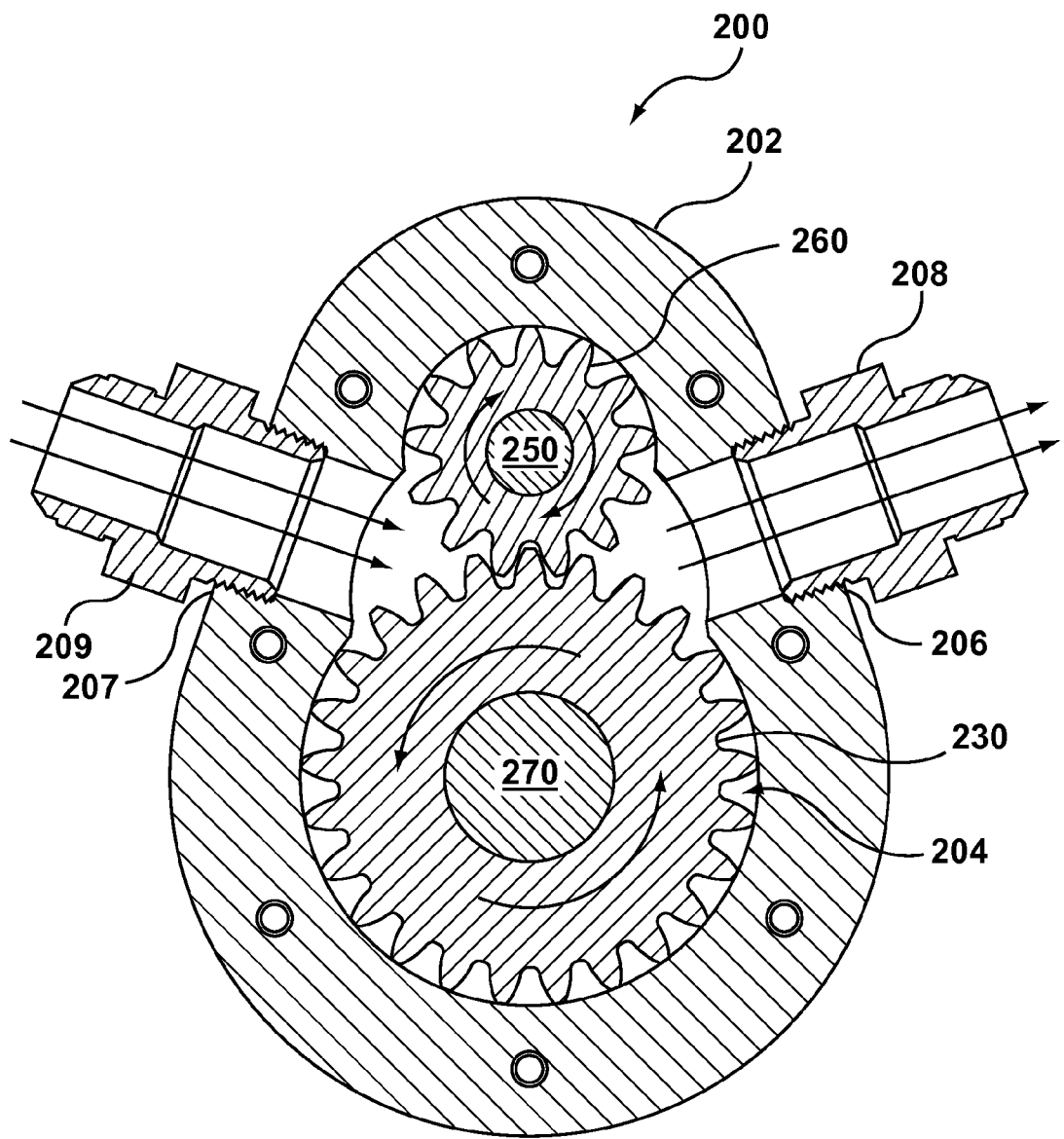
FIG. 3 is a cross-sectional view of the gear hub assembly of FIG. 2 illustrating the gear pump action.
Figure 4:
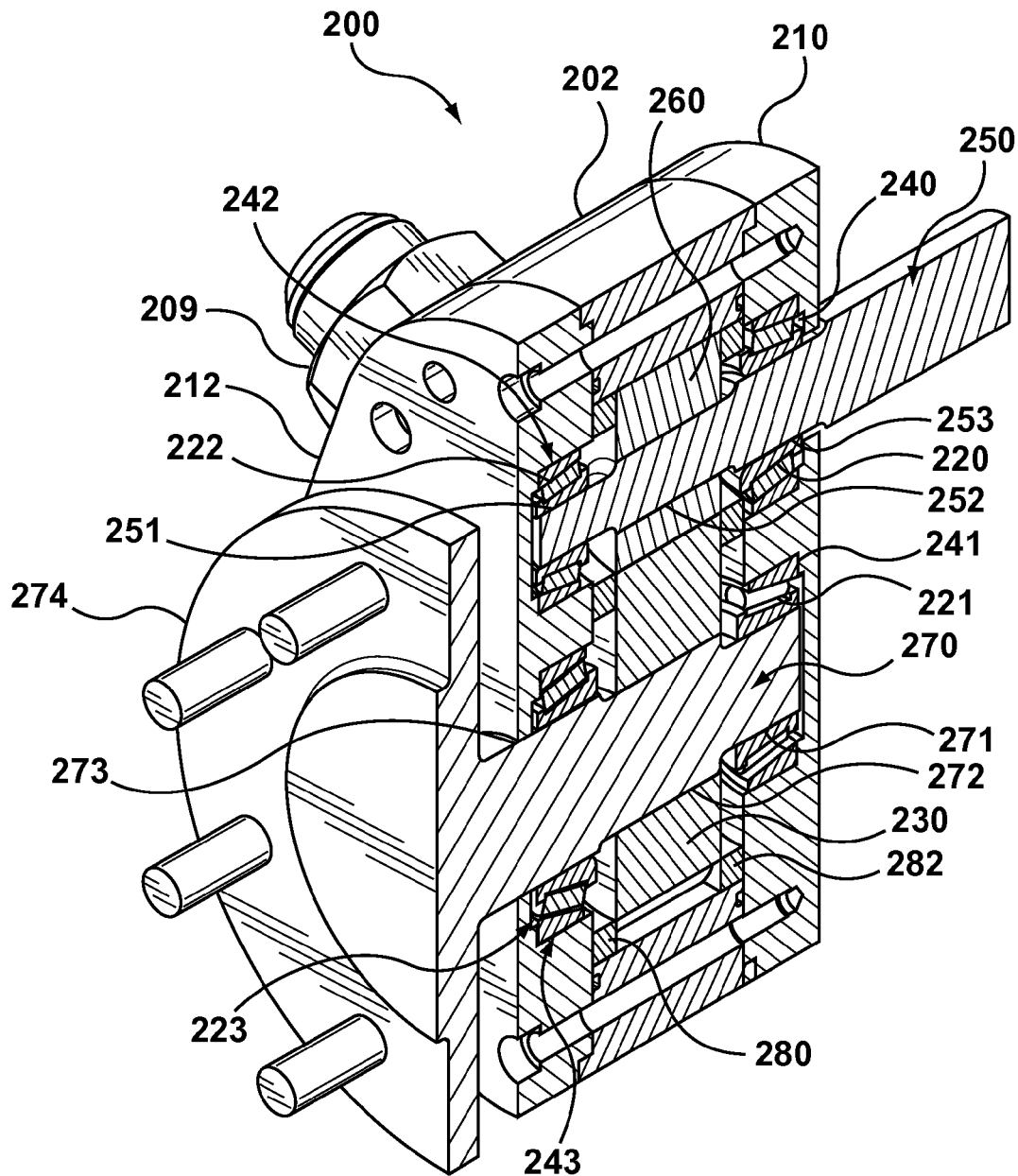
FIG. 4 is a perspective sectional view of the gear hub assembly of FIG. 2.
Figure 5:
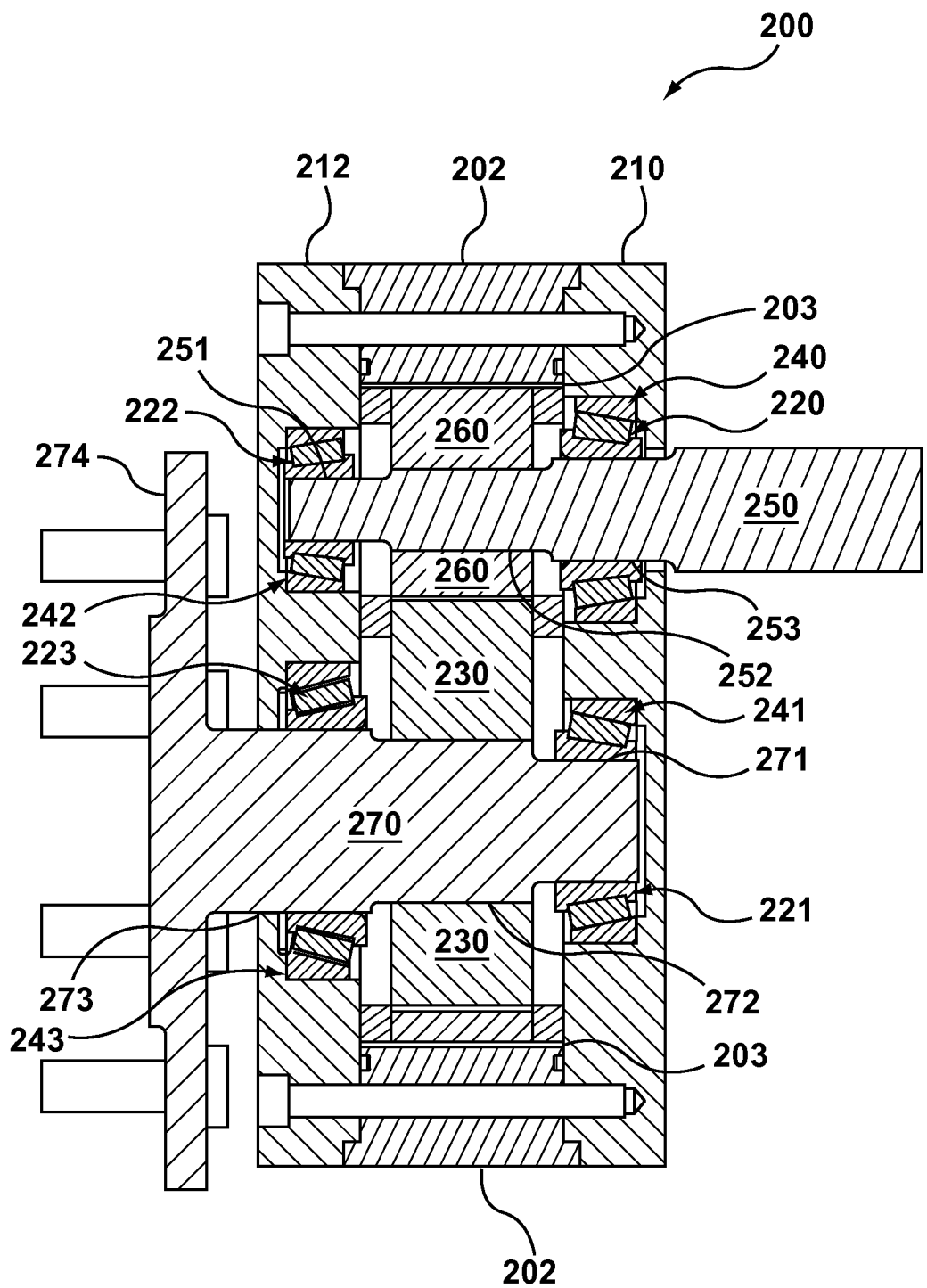
FIG. 5 is a side cross-sectional view of the gear hub assembly of FIG. 4.

FIGS. 2-6 illustrate a gear hub assembly 200 that provides a gear pump using input gear 260 and output gear 230 to move fluid through the housing 202. Housing 202 defines a gear chamber 204 for receiving input gear 260 and output gear 230 in close tolerance with a disposable sleeve 203 of housing 202. Disposable sleeve 203 is preferably removable as will be discussed further below. Gear chamber 204 includes a small and large circular recess for input gear 260 and output gear 230, respectively. The cross-sectional view in FIG. 3 illustrates the shape of gear chamber 204 to include a circular recess for the output gear 230 and a circular recess for the input gear 260. The close tolerances between housing 202 and input gear 260 and output gear 230 are also illustrated in FIG. 5.

A space is defined in the gear chamber 204 on opposite sides of engagement of input gear 260 and output gear 230 to allow input and output of fluid. Fluid ports 206 and 207 are defined in housing 202 on opposite sides of the point of engagement between input gear 260 and output gear 230.

Although input gear 260 is illustrated as an input pinion having a smaller size than output gear 230 other embodiments can have other relative sizes of input gear 260 and output gear 230. Using a smaller input pinion can assist with gear ratios in the differentials. In other embodiments input gear 260 and output gear 230 can be the same size or the output gear 230 can be smaller.

The term input gear 260 is used to denote the gear that is typically provided rotation from a vehicle drive train. The term output gear 230 is used to denote the gear that is typically coupled to wheel spindle 270. The terms input and output are used to distinguish between input gear 260 and output gear 230. In some cases, rotation of gears 230 and 260 can be provided by output gear 230, such as, for example, when the vehicle is rolling (e.g. coasting or moving downhill) and the drive train components are not engaged with input gear 260. This is described in more detail in the embodiment shown in FIG. 7.

Rotation of input gear 260 and output gear 230 produces a gear pump action that forces fluid within gear chamber 204 to circulate from one of the fluid ports 206, 207 to the other fluid port. FIG. 3 indicates the movement of fluid flow and of input gear 260 and output gear 230 using arrows. Movement of input gear 260 and output gear 260 creates displacement through the meshing of the gear teeth, which forces fluid out of the housing 202. In FIG. 3, fluid is entering fluid port 207 and is moved by input gear 260 and output gear 230 to fluid port 206. This gear pump action can be used to assist braking the vehicle by restricting the flow of fluid out of any one of the fluid ports. Resistance to the fluid flow will resist the rotation of input gear 260 and output gear 230 to slow rotation of the attached wheel, and thus the vehicle.

A disposable sleeve 203 surrounds the inner surface of housing 202 to protect the interior surface 205 of the housing 202 from wear from input gear 260 and output gear 230. Disposable sleeve 203 is removable to allow replacement when worn and is a relatively low cost part compared to replacing or repairing damage or wear to the precision machined housing 202. Disposable sleeve 203 can be comprised of ductile material that will wear away. Disposable sleeve 203 can be comprised of ductile iron, ampco or bronze to minimize wear if the gears 260,230 collide with disposable sleeve 203. In some embodiments, disposable sleeve 203 can be comprised of an oil-impregnated alloy, including copper or iron alloys, for example, that help reduce friction and wear between gears 260, 230 and disposable sleeve 203.

Figure 6:
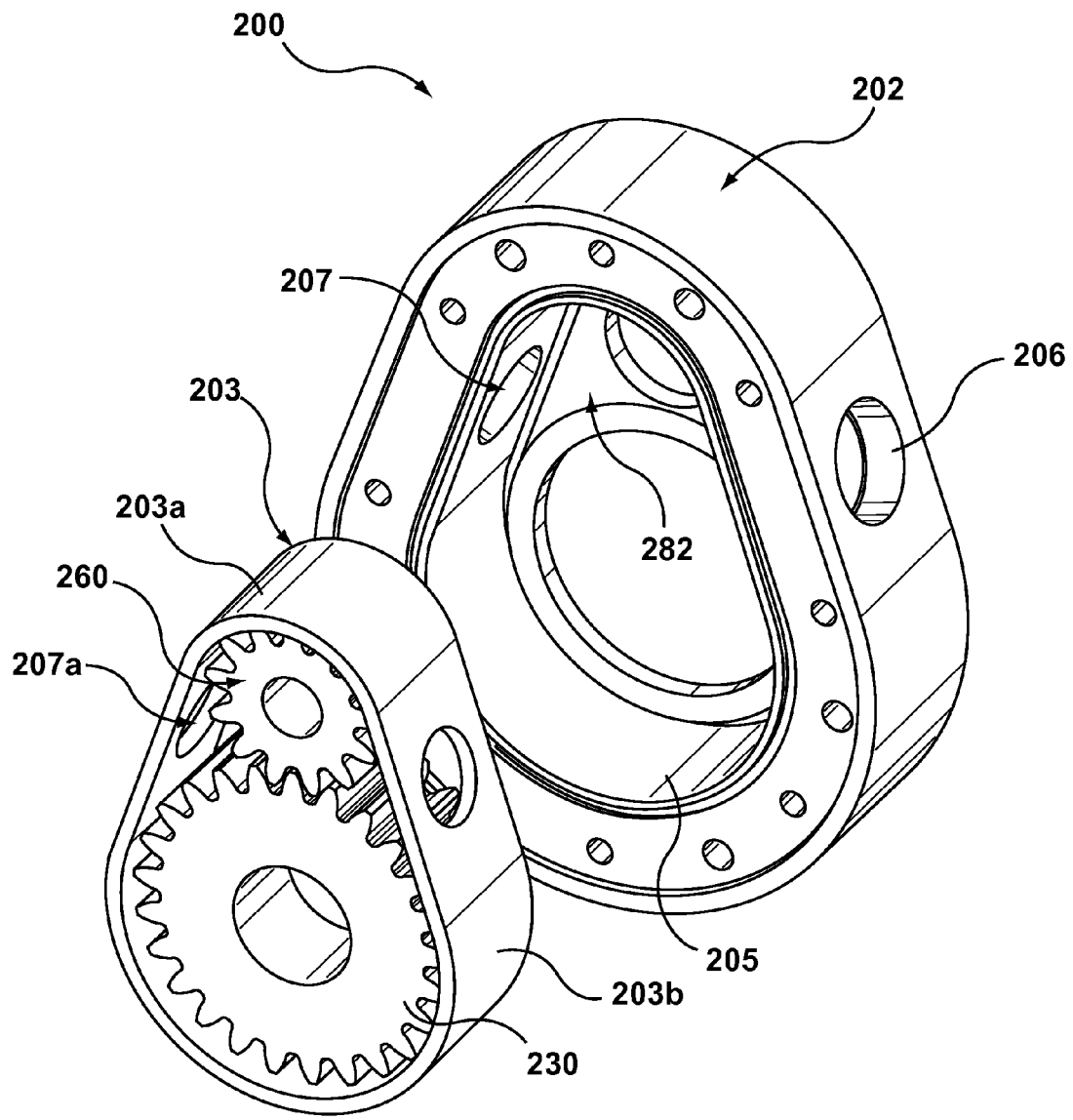
FIG. 6 a perspective view of gear hub assembly of FIG. 1 illustrating the disposable sleeve, input gear and output gear removed from the housing.

FIG. 6 shows a perspective view of gear hub assembly 200 illustrating disposable sleeve 203, input gear 260 and output gear 230 removed from housing 202. Disposable sleeve 203 has tight tolerances with input gear 260 and output gear 230 at top portion 203a and bottom portion 203b, respectively. Tight tolerances with disposable sleeve 203 increases the efficiency of the gear pump action of input gear 260 and output gear 230 to prevent fluid loss between the gears and interior surface 205 of housing 202. Disposable sleeve 203 can include fluid ports 206a and 207a that align with fluid ports 206 and 207 of housing 202.

In some embodiments, disposable sleeve 203 can be a partial sleeve (or sleeves) that does not cover the entire interior surface 205 of housing 202. For example, a partial sleeve can include top portion 203a of disposable sleeve 203 and a second partial sleeve can include bottom portion 203b of disposable sleeve 203 to protect interior surface 205 where input gear 260 and output gear 230 would most likely come in contact with interior surface 205. A partial sleeve would not need to include the portion of disposable sleeve 203 containing fluid ports 206a, 207a because this portion does not come into contact with gears 260, 230.

In some embodiments, disposable sleeve 203 can have a non-uniform thickness. For example, a portion of disposable sleeve 203 that is subject to increased wear may have increased thickness so that disposable sleeve 203 can have a longer service time before requiring replacement due to wear. An increase in thickness would extend from the external surface of disposable sleeve 203 to maintain internal tolerances with gears 260, 230. Housing 202 can be machined to accommodate the increased thickness of disposable sleeve 203.

The hydraulic system described below with respect to FIG. 7 can also be used to measure wear of disposable sleeve 203. As disposable sleeve 203 becomes more worn the efficiency of the gear pump action of input gear 260 and output gear 230 decreases. By measuring fluid flow relative to RPM of the axle shaft that is coupled to input gear 260, the hydraulic system can measure the efficiency of gear pump and thus wear of disposable sleeve 203. Hydraulic system can be coupled to a vehicle data bus to indicate a service requirement for the disposable sleeve.

Fluid ports 206 and 207 can be defined to accept hydraulic fittings 208 and 209 are part of a hydraulic system that is coupled to gear hub assembly 200. To provide braking to the wheel, the hydraulic system can include a mechanism to generate resistance to fluid flow of the gear pump action. The hydraulic system can include a fluid restrictor such as an adjustable valve to vary the fluid flow to control pressure within gear chamber 204. An exemplary hydraulic system is described in more detail with respect to FIG. 7 that provides for storage or redistribution of the kinetic energy from the gear pump action.

Housing 202 includes a first end cap 210 and a second end cap 212. Second end cap 212 defines holes for receiving bolts (not shown) to fasten both end caps 210 and 212 to housing 202. Housing 202 should provide a fluid seal to facilitate the pumping action, and can further include seals between end caps 210 and 212 and housing 202. Other embodiments of housing can use other designs, such as a split housing, similar to that illustrated in FIG. 1, or other designs of the housing can have at least one of end caps 210 or 212 integrally machined with housing 202.

Inner surfaces of end caps 210 and 212 define seatings 240-243 for receiving bearings 220-223. Seatings 240-243 provide a stepped shoulder for supporting the bearings. End cap 210 also defines an aperture 211 for receiving an axle shaft 250 that is attached to input gear 260. Aperture 211 extends through end cap 210 from one side to the other to allow a shaft to be inserted into housing 202 to engage with input gear 260. Axle shaft 250 can be stepped as illustrated, to define separate stepped portions 251-253 for mating with bearing 222, input gear 260, and bearing 220, respectively. Axle shaft 250 can also be splined to input gear 260 to transfer torque from axle shaft 250 to input gear 260.

Second end cap 212 similarly includes an aperture 213 for receiving wheel spindle 270 that attaches to output gear 230. Aperture 213 similarly extends through end cap 212 from one side to the other to allow a shaft to be inserted into housing 202 to engage with output gear 230. Wheel spindle 270 can include separate stepped portions 271-273 for mating with bearing 221, output gear 230, and bearing 223. Wheel spindle 270 can include a hub 274 for attaching a vehicle wheel.

Bearings 220-223 are preferably tapered roller bearings that can sustain large radial and axial forces. Bearings 220 and 222 are used to support axle shaft 250 and bearings 221 and 223 are used to support wheel spindle 270. Bearings 220-223 include inner and outer ring raceways that are segments of cones and tapered rollers so that the conical surfaces of the raceways and the roller axes if projected, would all meet at a common point on the main axis of the bearing. This conical geometry is used as it gives a larger contact patch, which permits greater loads to be carried than with spherical (ball) bearings, while the geometry means that the tangential speeds of the surfaces of each of the rollers are the same as their raceways along the whole length of the contact patch and no differential scrubbing occurs.

Thrust plates 280 and 282 can also be included on either side of input gear 260 and output gear 230 as illustrated in FIG. 4. Thrust plates 280 and 282 can be freely seated with sufficient tolerances and can be pressure balanced to improve the hydraulic efficiency of the pumping action of input gear 260 and output gear 230. When input gear 260 and output gear 230 are pumping fluid, hydraulic pressure within housing 202 balances the position of thrust plates 280 and 282 to move them towards the face of input gear 260 and output gear 230 to improve the seal between the gear faces and surface of thrust plates 280 and 282 to prevent fluid from moving back to low pressure or fluid input side within housing 202. Additional mechanical seals can be used between thrust plates 280, 282 and end caps 212, 210, respectively, to prevent fluid flowing between thrust plates 280, 282 and their respective end cap. In some embodiments, thrust plates 280 and 282 can be in a fixed position (i.e. non-floating) to provide a small gap between the faces of gears 260, 230 and thrust plates 280, 282.

Figure 7:
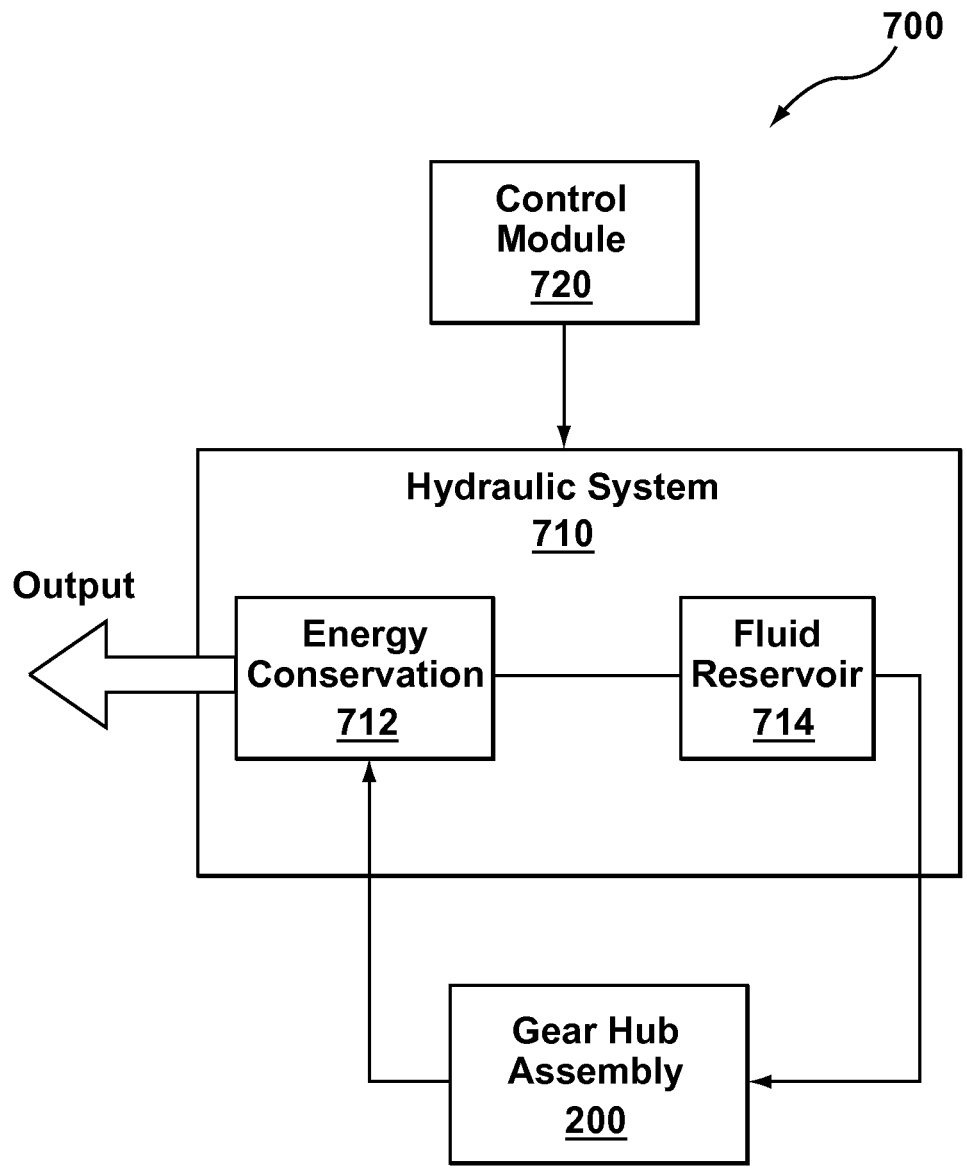
FIG. 7 is a block diagram of a vehicle system incorporating the gear hub assembly of FIG. 2.

Referring now to FIG. 7, a block diagram of a vehicle system 700 comprising a gear hub assembly 200 hydraulically coupled to a hydraulic system 710 that is controlled by a control module 720. Gear hub assembly 200 can be used with either powered or unpowered vehicles and is typically used with a portal axle (either regular or inverted) to provide increased or decreased ground clearance. A vehicle system can include multiple gear hub assemblies so that each wheel has a gear hub assembly. Other vehicle systems can use gear hub assemblies attached to only some of the wheels, for example, only the front wheels. Hydraulic system 710 can also be separate from gear hub assemblies 200, such as, for example, gear hub assemblies 200 can be attached to trailer wheels/axles and hydraulically coupled to hydraulic system 710 and control module 720 located on the trailer undercarriage or the tractor pulling the trailer.

Hydraulic system 710 can include a fluid reservoir 714 to be used as a container of fluid to gear hub assembly 200. Hydraulic system 710 can provide back pressure by restricting the hydraulic flow from the output of gear hub assembly 200. Fluid ports 206 and 207 of gear hub assembly 200 can act as either output or input ports depending on the direction of rotation of the vehicle wheels. Hydraulic system 710 can include redundant mechanisms or a mechanism to reroute the flow from fluid ports 206 and 207 to allow hydraulic system 710 to function in either forward or reverse direction of vehicle travel.

Hydraulic system 710 and gear hub assembly 200 can be used to provide braking to a vehicle under the instruction of control module 720. Control module 720 can be an electronic or electro-mechanical systems that provides control signals to hydraulic system 710 based on driver or vehicle control systems input. For example, control module 720 can receive braking instructions communicated by the driver depressing the brake pedal of the vehicle. In response, control module 720 can then instruct hydraulic system 710 to restrict fluid output of gear hub assembly 200 by actuating energy conversion system 712 of hydraulic system 710. Energy conversion system 712 restricts hydraulic output of gear hub assembly causing resistance to the gear pump action to slow down the vehicle wheels.

Energy conversion system 712 can include a restriction valve to provide braking assistance. Other embodiments of energy conversion system 712 can be used to provide energy storage to provide a kinetic energy recovery system. For example, energy conversion system 712 can store braking energy generated by the flow of fluid from gear assembly 200 as pressurized fluid in an accumulator. In other embodiments, energy conversion system 712 can include a motor that is driven by fluid from a gear hub assembly to provide rotary motion that can be stored mechanically using a flywheel or drive a generator to store the energy electrically. Stored energy from energy conversion system 712 can then later be used to power the vehicle wheels, such as to provide launch assist, or other vehicle systems.

Figure 8:
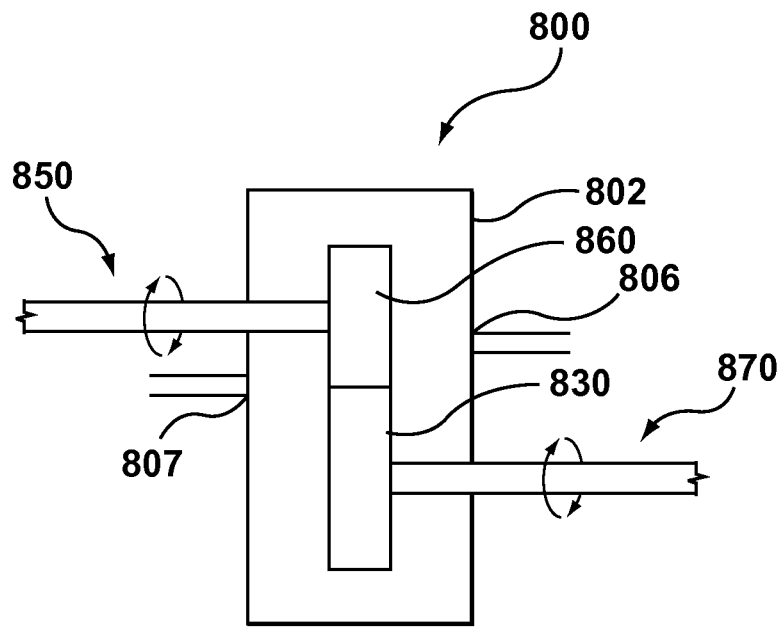
FIG. 8 is a block diagram of an embodiment of a gear hub assembly coupled to a wheel spindle and an axle shaft on opposing sides of the housing.

Referring now to FIG. 8, a block diagram of a gear hub assembly 800 comprising a sealed housing 802 containing first gear 860 and second gear 830 that are meshed together to provide a gear pump. The pumping action provided by the interaction of first gear 860 and second gear 830 moves fluid within the housing between a first fluid port 806 and a second fluid port 807. The pumping action can be generated by torque transmitted by a first shaft 850 or a second shaft 870. In some embodiments, the first shaft 850 can be an axle shaft that transmits torque to the gear hub assembly 800 and the second shaft 870 can be a wheel spindle that is coupled to the hub of a vehicle wheel.

Under power of the vehicle, first shaft 850 transmits torque to first gear 860 that causes it to rotate. The first gear 860 can be splined with first shaft 850 so that they rotate together. First gear 860 has teeth that mesh with the teeth of second gear 830 that provides the pumping action and transmits the rotation of the first gear 860 to the second gear 830. The second shaft 870 is coupled to the second gear 830 and rotates with the second gear 830. The first and second gears 860, 830 function to transmit torque between first shaft 850 and second shaft 870 as well as act as a gear pump to move fluid between the first and second ports 806, 807.

Torque from the second shaft 870 can also be used to drive the first and second gears 860, 830 of gear hub assembly when gear hub assembly 800 is not being powered by the vehicle transmission through first shaft 850. For example, when first shaft 850 is not engaged with the power train of the vehicle or under braking, torque from the vehicle wheels is transmitted through second shaft 870, such as a wheel spindle, for example, to second gear 830. First gear 860 is meshed with second gear 830 to provide a gear pump to move fluid through the housing between first and second ports 806, 807. By restricting this flow of fluid between the first and second ports 806, 807, fluid pressure is increased that results in a slowdown of the fluid flow that in turn restricts the gear pump action and provides resistance to the rotation of first and second gears 830, 860. This resistance can be used to decelerate the vehicle by resisting the torque on second shaft 870. The resistance can be provided by a hydraulic system as described above.

Figure 9:
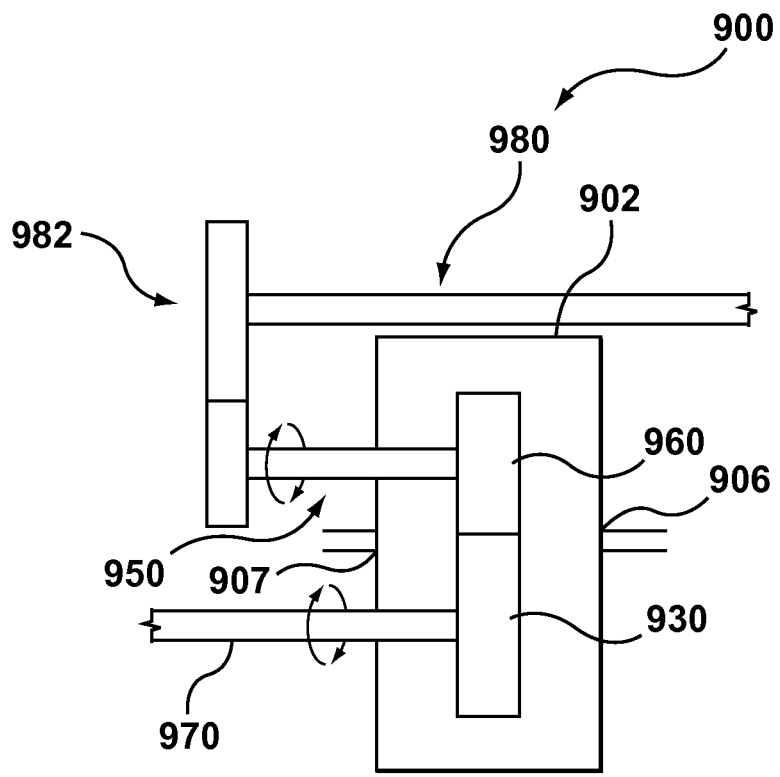
FIG. 9 is a block diagram of an embodiment of a gear hub assembly coupled to a wheel spindle and axle shaft on the same side of the housing.

Referring now to FIG. 9, a block diagram of an embodiment of a gear hub assembly 900 is shown coupled to a first shaft 950 and second shaft 970 on the same side of the housing 902. As illustrated in the embodiments shown in FIGS. 2-6, housing 902 can comprise an end cap (e.g. first and second end caps 210 and 212), that in the embodiment illustrated in FIG. 9 can have both shafts extending therefrom. For example, first end cap 210 can define both an axle shaft-receiving aperture and a wheel spindle-receiving aperture.

In the embodiment illustrated in FIG. 9 the torque from the vehicle is transmitted by a primary axle shaft 980 through gears 982 to provide torque to first shaft 950. This arrangement can be used to provide additional ground clearance for primary axle shaft 980.

The torque is transmitted to first gear 960 that meshes with second gear 930 to pump fluid through housing 902 between first and second ports 906, 907. In addition to the pumping action, first gear 960 transmits torque to second gear 930 to transmit torque to second shaft 970.

Embodiments of the gear hub assembly described herein can be used for many different applications. The gear hub assembly is able to function as a pump to move fluid between the fluid ports or as a motor that is powered by fluid pressure between the fluid ports. This allows the gear hub assembly to be used to propel the vehicle or assist braking the vehicle. The gear hub assembly can be used to store the braking energy and to convert that stored energy into mechanical energy to propel the vehicle. For example, a 4-wheel drive vehicle can have gear hub assemblies installed at all four wheels that can be used to retard the vehicle, store braking energy in the hydraulic system, and propel the vehicle by converting the stored energy to mechanical energy.

In one application, two gear hub assemblies can be coupled to the driven wheels of a vehicle (e.g. the rear wheels of a rear-wheel drive vehicle or the front wheels of a front-wheel drive vehicle) and have the outlet fluid ports connected to the inlet fluid port of two gear hub assemblies on the non-driven wheels. For example, in a rear-wheel drive vehicle, the fluid outlets on the gear hub assemblies on the rear wheels can provide fluid flow/pressure to the fluid inlet of the gear hub assemblies on the front wheels to drive the front wheels. The fluid outlet ports of the front wheel gear hub assemblies can be coupled to the hydraulic system. Gear hub assemblies can be used to provide a 2-wheel drive to 4-wheel drive conversion that does not require all the current mechanical hardware found in 4-wheel drive vehicles. Alternatively, the gear hub assembly can be used in other combinations such as one wheel driving another wheel.

Figure 10:
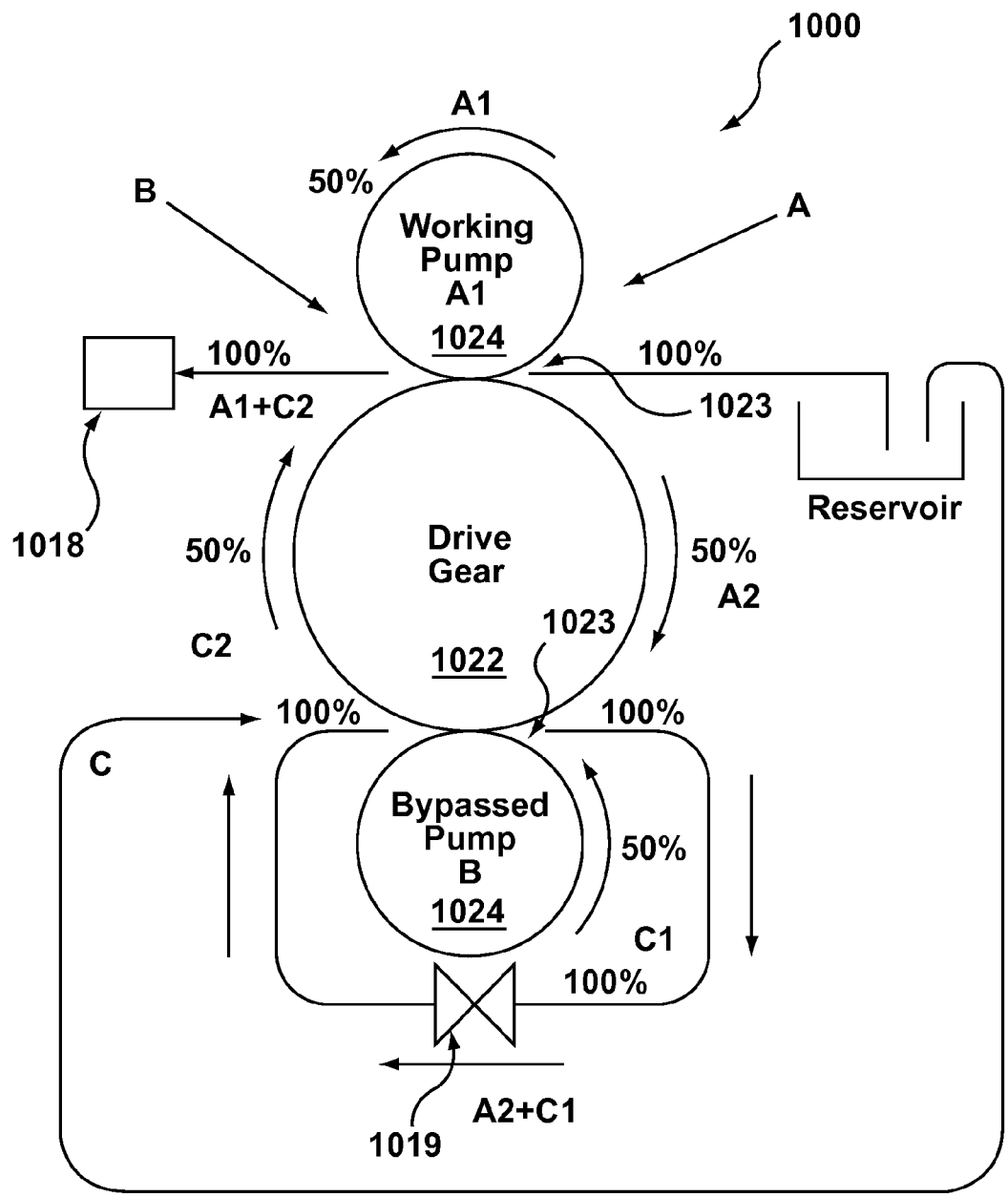
FIG. 10 is a block diagram of a further embodiment of the gear hub of FIG. 2.

Referring to FIG. 10 is a schematic of a by-pass loop as an alternative embodiment of the gear hub device 1000. As described earlier each pump "hands off" portion (e.g. ~50%) of its total intake to the nearest gear cluster 1023 (e.g. primary gear 1022 meshing with secondary gear 1024), the handoff direction dictated by pump rotational direction. When a valve is opened to "short" hydraulic flow, the fluid does not simply loop locally. Fluid is drawn from a fluid reservoir, at the interface of pump A and the drive gear 1022, shown at arrow A. Portion (e.g. ~50%) of the fluid follows pump A, as it rotates, to the high pressure side, shown at arrow B.

The working pump A continuously pushes a portion (e.g. ~50%) flow volume, of the fluid drawn in, to the bypassed pump B via drive gear 1022, i.e. portion (e.g. ~50%) is carried by drive gear 1022 to pump B. An initial fluid is drawn into the low pressure side of Pump B, at position C, of this portion (e.g. ~50%) is carried by the drive gear 1022 to join with the portion (e.g. ~50%) carried around pump A to result in total fluid output. Of the fluid drawn in at position C, portion (e.g. ~50%) follows pump B around to meet with the portion (e.g. 50%) that has been passed from working pump A. The combined portions are then recirculated through the cluster. The net effect: the bypass solenoid has shorted out pump B and the circuit behaves as if that pump simply does not exist. Instead of outputting portion (e.g. ~50%) of the fluid, the fluid is simply recirculated within pump B via the solenoid. In other words, the portion (e.g. ~50%) volume has simply passed through as though pump B were not there. It will therefore be clear that every cluster that is in the bypass mode will always have a fresh injection of portion (e.g. ~50%) of cooled oil with every revolution. One advantage of the injection of fresh oil in the bypass mode is for cooling purposes of the overall gear hub device and/or for respective gear devices 1023 adjacent to the bypassed gear device 1023.

Referring to FIG. 10, shown is that inlet fluid A is split into fluid portions A1 and A2 and inlet fluid C is split into fluid portions C1 and C2. As pump A is not in bypass mode, the secondary gear of pump A carries fluid portion A1 over to output port B and main gear 1022 carries fluid portion C2 over to output port B, thus providing for total output at port B of combined fluid portions C2 and A1. In terms of bypassed secondary gear/pump B, inlet fluid portion C1 is carried around by the secondary gear 1024 to meet incoming fluid portion A2 carried by main gear 122. These two portions then meet and combine as portions C1+A2 and flow via the bypass valve 119 over to inlet port C. Next, a portion of the combined C1+A2 is directed as new portion C2 and the remainder is drawn from the reservoir as new portion C1. When bypass valve 1019 is opened, as described, the fluid will take the path of least amount of resistance. In other words, given that pump A is working it is understood that a control valve 1018 can be partially closed, thus offering a flow restriction for the output of gear device A in FIG. 10. The fluid will therefore have an easier time flowing via the bypass valve 1019 than via the flow restriction offered by control valve 1018. Fluid will therefore flow or otherwise partially recirculate (e.g. portion C1 carried by secondary gear first to meet portion A2 and then back through valve 1019 to inlet port C) in the bypassed gear device 1023 and not to the output port (not shown where A2 and C1 meet) of the bypassed pump B. It is noted that every gear device 1023 can have a respective bypass valve 1019 associated therewith, thereby providing for the passage of fluid directly from the outlet port of the gear device 1023 directly to the input port of the gear device 1023, for use as part of the next draw of fluid into and processed by the bypassed gear device 1023.

Therefore, in situations where higher hydraulic pressure with reduced fluid flow rates (e.g. fluid volume) is desired as total fluid output from the gear hub device, bypass valve(s) 1019 are opened for one or more respective gear devices 1023 so that the remaining working (e.g. pumping) gear device(s) 1023 (those gear devices 1023 not in bypass mode) can be used to provide the hydraulic higher pressure total fluid output. It is recognized that the terms higher and lower are relative to the gear hub device working in non-bypass mode or otherwise having a greater number of gear devices 1023 in non-bypass mode, as compared to the higher pressure and reduced volume provided by the remaining gear devices 1023 that are hydraulically coupled to the total output of fluid from the gear hub device.

As noted, the gear hub device can contain multiple gear devices 1023 with respective by pass vales 1019, such that selective bypass (via bypass valve 1019 operation) of each gear device 1023 within the gear hub device can be implemented via operational control of the respective bypass valve 1019 of the respective (i.e. associated with) gear device 1023. It is also recognized that one bypass valve 1019 can be associated with and therefore control the bypass mode with two of more gear devices 1023, as desired. Another way to define bypass valve 1019 operation is that bypass valve(s) 1019 can be used to either engage hydraulically (via valve 1019 close to block fluid flow there-through) or disengage hydraulically (via valve 1019 open to allow fluid flow there-through) the respective associated gear device(s) 1023 from the other gear device(s) 1023 of the gear hub device.

Therefore, in effect the use of the bypass valve(s) 1019 provides for hydraulic decoupling of the associated gear device(s) 1023 from the total output flow of the gear hub device while at the same time providing for the associated gear device(s) 1023 to remain mechanically coupled in the gear cavity (e.g. interior of the housing) with all of the other gear devices 1023 contained therein. This is advantageous for gear cooling and lubrication purposes. As such, it is recognized that the gear hub can contain more than two gears, as desired.

This can be repeated for more than one pump provided each includes a solenoid valve (e.g. bypass valve 1019), or any other means that allows a pump gear cluster to be bypassed from the total number of gear devices/clusters 1023 of the gear hub device, and allows for repeated flow of the fluid within pump B. Since pumps 1023 are mechanically geared together, displacement can be identical and portion (e.g. ~50%) of each input is passed to the nearest pump 1023 output, limited pressure head can be generated and the serial handoff can occur at minimal pressure. Upon finally arriving at a "working pump" 1023, the carried portion (e.g. ~50%) joins the awaiting portion (e.g. ~50%), and total combined portions exit (positive displacement device). Pressure output of the gear device 1023 can be dictated by the control valve 1018 setting. It will be understood that when the multi-cluster gear hub device is engaged, if only one gear cluster device 1023 is working, the by-pass loop allows for the rest of the gears to be kept lubricated and therefore cooled, i.e. whenever a situation arises where one or more pump gear cluster devices 1023 is not working the gears do not run dry. In addition the gears are kept cool by continuous fluid flow.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

The invention claimed is:

1. A gear hub assembly comprising:
   a housing defining a first shaft-receiving aperture and a second shaft-receiving aperture;
   an input gear within the housing with respect to the first shaft-receiving aperture;
   an output gear within the housing engaged with the input gear, the output gear with respect to the second shaft-receiving aperture; and
   a fluid inlet and a fluid outlet disposed on opposite sides of engagement of the input gear and the output gear;
   wherein the input gear is configured to receive a rotational force and transfer the rotational force to the output gear, the rotational force provided by an axle shaft received through the first shaft-receiving aperture and coupled to the input gear.

2. The gear hub assembly of claim 1, wherein the input gear is splined to the axle shaft.

3. The gear hub assembly of claim 2, wherein the axle shaft is supported by a pair of tapered bearings on each side of the input gear.

4. The gear hub assembly of claim 3, wherein the housing comprises end caps that each define a recess for seating a corresponding one of the pair of tapered bearings.

5. The gear hub assembly of claim 1, wherein the first shaft-receiving aperture and the second shaft-receiving aperture are located on opposite sides of the housing.

6. The gear hub assembly of claim 1, wherein a hydraulic system is coupled to the fluid outlet and the fluid inlet.

7. The gear hub assembly of claim 6, wherein the hydraulic system comprises at least one restriction mechanism to restrict fluid flow between the fluid outlet and the fluid inlet.

8. The gear hub assembly of claim 6, wherein the hydraulic system comprises an energy storage and delivery system.

9. A vehicle braking system having at least two gear hub assemblies, each of the at least two gear hub assemblies comprising:
   a housing defining a first shaft-receiving aperture and a second shaft-receiving aperture;
   an input gear within the housing with respect to the first shaft-receiving aperture;
   an output gear within the housing engaged with the input gear, the output pear with respect to the second shaft-receiving aperture;
   a fluid inlet and a fluid outlet disposed on opposite sides of engagement of the input gear and the output gear;
   an axle shaft coupled to the input gear; and
   a wheel spindle coupled to the output gear.

10. The vehicle braking system of claim 9 wherein the the axle shaft is any one of a portal axle and an inverted portal axle.

11. A gear hub assembly comprising:
    a housing defining a first shaft-receiving aperture and a second shaft-receiving aperture;
    an input gear within the housing with respect to the first shaft-receiving aperture;
    an output gear within the housing engaged with the input gear, the output gear with respect to the second shaft-receiving aperture; and
    a fluid inlet and a fluid outlet disposed on opposite sides of engagement of the input gear and the output gear;
    wherein the output gear is coupled to a wheel spindle received through the second shaft-receiving aperture.

12. The gear hub assembly of claim 11, wherein the wheel spindle is supported by a pair of tapered bearings on each side of the output gear.

13. The gear hub assembly of claim 12, wherein the housing comprises end caps that each define a recess for seating a corresponding one of the pair of tapered bearings.

14. A gear hub assembly comprising:
    a housing defining a first shaft-receiving aperture and a second shaft-receiving aperture;
    an input gear within the housing with respect to the first shaft-receiving aperture;
    an output gear within the housing engaged with the input gear, the output gear with respect to the second shaft-receiving aperture;
    a fluid inlet and a fluid outlet disposed on opposite sides of engagement of the input gear and the output gear; and
    a pair of thrust plates, each one of the plates adjacent opposing faces of the input gear and output gear.

15. The gear hub assembly of claim 14 further comprising a disposable sleeve lining in an interior of the housing.

16. The gear hub assembly of claim 15, wherein the disposable sleeve provides a predefined tight tolerance between the input gear and output gear and the disposable sleeve.

17. The gear hub assembly of claim 16, wherein the disposable sleeve is comprised of one or more partial sleeves.

18. The gear hub assembly of claim 16, wherein the disposable sleeve has an increased thickness in one or more areas.

\* \* \* \* \*